United States Patent
Lee et al.

(10) Patent No.: US 8,539,109 B1
(45) Date of Patent: Sep. 17, 2013

(54) THIRD PARTY DIRECT MEMORY ACCESS PROTOCOL EXTENSION TO SEPARATE DATA PATH FROM CONTROL PATH

(75) Inventors: Whay Sing Lee, Milpitas, CA (US); Richard W. Meyer, Redwood City, CA (US); Charles D. Binford, Wichita, KS (US); Rodney A. Dekoning, Wichita, KS (US); William Stronge, Westford, MA (US)

(73) Assignee: Oracle America, Inc., Redwood City, CA (US)

( * ) Notice: Subject to any disclaimer, the term of this patent is extended or adjusted under 35 U.S.C. 154(b) by 2963 days.

(21) Appl. No.: 11/075,970

(22) Filed: Mar. 9, 2005

(51) Int. Cl.
*G06F 15/16* (2006.01)
(52) U.S. Cl.
USPC .................. 709/249; 709/217; 709/218
(58) Field of Classification Search
USPC ................................................ 709/249
See application file for complete search history.

(56) References Cited

U.S. PATENT DOCUMENTS

| | | | |
|---|---|---|---|
| 7,188,194 B1 * | 3/2007 | Kuik et al. | 709/249 |
| 7,506,073 B2 * | 3/2009 | Kuik et al. | 709/249 |
| 2002/0007460 A1 * | 1/2002 | Azuma | 713/201 |
| 2002/0059451 A1 * | 5/2002 | Haviv | 709/238 |
| 2003/0014544 A1 * | 1/2003 | Pettey | 709/249 |
| 2005/0120141 A1 * | 6/2005 | Zur et al. | 709/249 |
| 2006/0013251 A1 * | 1/2006 | Hufferd | 370/466 |

FOREIGN PATENT DOCUMENTS

WO   WO 2005/057880 A2 *  6/2005

* cited by examiner

*Primary Examiner* — Jeffrey Nickerson
(74) *Attorney, Agent, or Firm* — Marsh Fischmann & Breyfogle, LLP; Kent A. Lembke; William J. Kubida

(57) ABSTRACT

A network communication system and method providing a communication protocol extension for direct memory access operations allowing the separation of the command and data paths. The identification of the communication path to a third-party device is provided to a direct-memory-access initiator allowing the passing of data directly to the third-party device.

12 Claims, 4 Drawing Sheets

THIRD PARTY DIRECT MEMORY ACCESS PROTOCOL EXTENSION TO SEPARATE DATA PATH FROM CONTROL PATH

BACKGROUND OF THE INVENTION

1. Field of the Invention

The present invention relates to a system and method for network communication. Specifically, this invention relates to a system and method for using a protocol extension to separate data path from control path.

2. Description of Related Art

Various network systems are currently available, many of which are combined to create larger integrated systems. Many network systems use differing communication methods and protocols. During data read and write operations standard protocols typically communicate data packets and control packets across the same communication path. For example, in the industry standard Small Computer Systems Interface (SCSI) over Remote Direct Memory Access (RDMA) protocol (SRP) definition, the SRP command, its corresponding RDMA operations, and the corresponding SRP response, must all be transferred via the same RDMA channel, that is, going through the same q-pairs of the nodes involved in the RDMA and SRP communications. Therefore, the CPU issuing the SRP command and the memory containing the data to be transferred must be located on the same node.

SCSI is one of the most common interfaces used to request block storage services for current networks. SCSI is a client-server architecture and a SCSI transport maps the client-server SCSI protocol to a specific interconnect. One such SCSI transport is Internet SCSI, or iSCSI. iSCSI is a mapping of the SCSI remote procedure call over the TCP protocol.

The SCSI layer builds and receives SCSI CDBs (Command Descriptor Blocks) and passes/receives them and their parameters to/from the iSCSI layer. The iSCSI layer builds/receives iSCSI PDUs (Protocol Data Unit) and relays them to/from one or more TCP connections. One or more TCP connections that link an initiator with a target form a session. Connections within a session are identified by a CID (connection ID). Sessions are identified by the SID (session ID). For any iSCSI request issued over a TCP connection, the corresponding response and/or other PDUs must be sent over the same connection. This is called command connection allegiance. Thus, if an initiator sends a READ command, the target must send the requested data and the status to the initiator over the same TCP connection that was used to deliver the SCSI command. iSCSI presents the same restriction as SRP.

iSCSI Extensions for RDMA (iSER) provides an RDMA capability to iSCSI by layering iSCSI on top of Remote Direct Memory Access Protocol (RDMAP). RDMAP permits data to be transferred directly in and out of buffers without intermediate data copy operations.

The restrictions inherent in these systems can strain a system designer's ability to place the control path and data path functionality on distinct network nodes, which may be useful for scaling performance and/or simplifying synchronization/coherent protocol. These and other deficiencies exist in current network systems, therefore, a solution to these and other problems is needed to provide a network system capable of transmitting data information and command information over separate data paths to separate nodes within the network.

SUMMARY OF THE INVENTION

Accordingly, the present invention is directed to a network communication system and method. The objectives and other advantages of the invention will be realized and attained by the structure particularly pointed out in the written description and claims hereof as well as the appended drawings.

Thus, the invention provides a communication protocol extension for third-party direct memory access operations allowing the separation of the command and data paths. The present invention also provides a mechanism for standard protocol operations to continue to work within the extended capabilities of the present invention; for example, when a standard-protocol initiator is paired with a third-party direct-memory-access target or a third-party direct-memory-access initiator is paired with a standard-protocol target. Furthermore, a third-party remote-direct-memory-access initiator paired with a third-party remote-direct-memory-access target may also choose to operate using standard protocol operations instead of invoking the remote-third-party direct-memory-access capability. Accordingly, the present invention achieves backwards compatibility with standard protocols.

In accordance with one embodiment of the present invention, a network system for separating control path and data path is provided that includes a first node for initiating an operation command, a second node logically connected to the first node for receiving and responding to the operation command initiated by the first node, and initiating a direct memory access command, and a third node logically connected to the second node for receiving and responding to the direct memory access command initiated by the second node.

In a further embodiment of the present invention, a method for processing a read request is provided that includes the steps of initiating a read command by an initiator, receiving the read command by a target, writing data by the target to a third party, and sending a status response by the target to the initiator.

In another embodiment of the present invention, a method for processing a write request is provided that includes the steps of initiating a write command by an initiator, receiving the write command by a target, sending a read request from the target to a third party, sending a read response with data from the third party to the target, and sending a status response by the target to the initiator.

In a further embodiment of the present invention, a method for selecting a communications path is provided that includes the steps of initiating an operation by an initiator, receiving a first access privileges specifier by a target, and obtaining a first communications path identifier for the path between the initiator and the target.

It is to be understood that both the foregoing general descriptions and the following detailed description are exemplary and explanatory and are intended to provided further explanation of the invention as claimed.

BRIEF DESCRIPTION OF THE DRAWINGS

The accompanying drawings, which are included to provide further understanding of the invention are incorporated in and constitute a part of this specification, illustrate embodiments of the invention and together with the description serve to explain the principles of the invention. In the drawings.

DETAILED DESCRIPTION OF VARIOUS EMBODIMENTS

Reference will now be made in detail to various embodiments of the present invention, examples of which are illustrated in the accompanying drawings.

Figure 1:
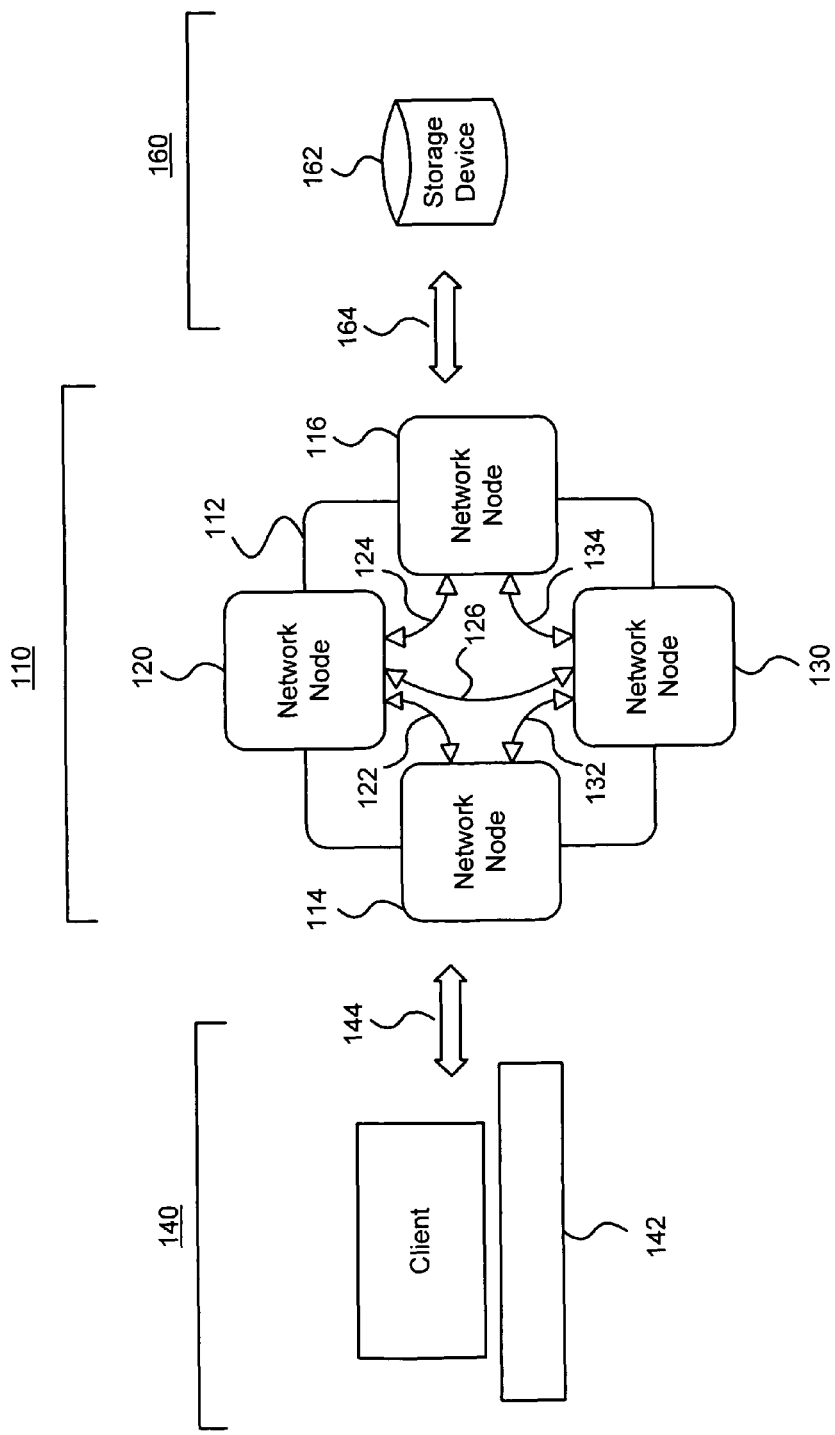
FIG. 1 shows a network system in accordance with an embodiment of the present invention.

FIG. 1 shows a network system in accordance with an embodiment of the present invention. In FIG. 1, a server system 110 is made up of various network nodes 114, 116, 120, and 130 clustered or connected through interconnection fabric 112. Network nodes 114, 116, 120, and 130 may be configured according to various embodiments of the server system 110. For example, in one embodiment each node acts as a separate server within the server system 110. In a further embodiment, nodes 114 and 116 provide gateway capability interconnecting a client system 140 and storage device system 160 with server system 110. As shown in FIG. 1, client system 140 includes one or more clients 142 that interact with server system 110 through interconnection fabric 144. As also shown in FIG. 1, data storage system 160 includes one or more storage devices 162 that are accessed by the server system 110 through interconnection fabric 164. In another embodiment, node 120 is a processor node, and node 130 is a cache memory node.

It will be apparent to one skilled in the art that many different combinations of nodes with differing functionality may be implemented to form server system 110 and remain within the scope of the present invention. While many node combinations are available, node 120 will be referred to as a processor node, node 130 will be referred to as a cache memory node, and nodes 114 and 116 will be referred to as gateway nodes for purposes of the following explanation.

Also shown in FIG. 1 are communication paths 122, 124, 126, 132, and 134. During read and write operations various communication paths 122, 124, 126, 132 and 134 may be established within the interconnection fabric 112 to allow the passing of control and data packets among the various nodes 114, 116, 120, and 130.

According to the present invention, a third-party-remote-direct-memory-access protocol extension is implemented within server system 110. The third-party-remote-direct-memory-access protocol allows an initiator node, such as gateway node 114, to perform read and write operations with a target node, such as processor node 120, where the remote direct memory access requests generated by the target, processor node 120, are directed to a third-party node, such as cache memory node 130. For convenience, the three-node remote-direct-memory-access functionality, or use of a third-party node in remote direct memory operations, is referred to as 3rd Party Remote Direct Memory Access or "3PRDMA."

In one embodiment, a 3PRDMA operation begins with an initiator node (e.g., gateway node 114) sending a 3PRDMA command to a 3PRDMA capable target node (e.g., control processor node 120). The command includes an opcode specifying the requested action, such as a read or write operation, and a 3PRDMA tuple including a 3PRDMA-R-key, a Remote Virtual Address, and Transfer Length. The 3PRDMA-R-key identifies the access privileges of the target node in relation to the initiator node, which determines whether the read or write operations are allowed to the specified memory location. The specified memory location is identified by the Remote Virtual Address, which provides the starting memory location within the initiator and the Transfer Length, which identifies the amount of data to be transferred during the remote-direct-memory-access operation.

In accordance with an embodiment of the present invention, the target node (e.g., control processor node 120) using a look-up operation identifies a third-party node (e.g., data cache node 130) to receive the remote-direct-memory-access request from the target. The target node (control processor node 120) performs the look-up in a mapping table referred to as the 3PRDMA-MAP. During the look-up operation the target node compares the 3PRDMA-R-key received in the original 3PRDMA command and the path identifier of the path over which the original 3PRDMA command was received (the "Original-Path-ID") with entries in the 3PRDMA-MAP. The 3PRDMA-MAP maintains a list of 3PRDMA-R-key and Original-Path-ID pairs, each of which include a corresponding R-key and path identifier pair. If a matching 3PRDMA-R-key, Original-Path-ID pair is found, the corresponding R-key and path identifier, referred to as the Derived-R-key and the Derived-Path-ID, identifying a third-party node are used in the subsequent 3PRDMA request. As a further example, in an embodiment using SCSI over RDMA, the Original-Path-ID and the Derived-Path-ID would be q-pair identifiers. Accordingly, the Original-Path-ID and the Derived-Path-ID would be identified as Original-QP-ID and Derived-Path-ID.

The Derived-R-key encodes the corresponding access privileges available to the target node as it relates to the third-party node (data cache node 130) to be used in the 3PRDMA operation. The Derived-Path-ID specifies the remote-direct-memory-access channel that is established between the target node and the third-party node over which the 3PRDMA operation will be communicated.

Accordingly, the remote-direct-memory-access request is sent to the third-party node identified by the Derived-Path Identifier with a tuple of the Derived-R-key, Remote Virtual Address, and Transfer Length. Once the 3PRDMA operation is completed, the target node, control processor node 120, sends a status response message to the initiator node, gateway node 114, indicating the result of the 3PRDMA operation.

In a further embodiment, the target node (e.g., control processor node 120) also passes an L-key, Virtual Address tuple. The L-key identifies access privileges the third-party node (e.g., data cache node 130) has with respect to the target node (e.g., control processor node 120). The Virtual Address identifies the memory location in the target node (e.g., control processor node 120) to be used by the third-party node (e.g., data cache node 130).

In another embodiment using iSER, the 3PRDMA command conveys a tuple including R-STag, Remote Transfer Offset (RTO), and Transfer Length values pertaining to the initiator node. The R-STag identifies a named buffer and access privileges with regard to the initiator node. The RTO identifies the offset from the base address of the buffer identified by the R-STag. The Transfer Length provides the amount of data to be transferred.

In accordance with a further embodiment, TCP sessions are logically associated with nodes 114, 116, 120, and 130 of server system 110. Accordingly, a direct-memory-access session identifier ("DMA SID"), identifying the session and connection between the initiator and the target, is used for the look-up operation in the target node. Accordingly, a Derived-DMA-SID identifying the session between the target and the third-party node is used for the third-party remote-direct-memory-access operation between the target node and the third-party node. Accordingly, the remote-direct-memory-access request generated by the target conveys a Derived-R-STag, RTO, and Transfer Length values pertaining to the target's access to the third-party node and using the Derived-DMA-SID for the communication path.

In a further embodiment, an L-STag, and LTO (local tagged offset) values are provided pertaining to the third-party node's access to the target node. According to an embodiment of the present invention, the {L-STag, LTO} tuple is provided by memory management software, which manages the allocation of memory in the target nodes for use by the third-party nodes. At initialization the initiator node instructs the target node to set aside a specified amount of memory to be used as data cache. The advertising of the L-STag results in permitting this memory region for external access with the third-party node.

Accordingly, in one embodiment of the present invention, a read operation begins with a gateway node 114 sending a read command to a control processor node 120. In turn, the control processor node 120 identifies a data cache node 130 with a look-up operation and initiates a 3PRDMA write request including the requested data to a data cache node 130. Upon completing the requested data transfer, the control processor node 120 passes a status response message to the gateway node 114 indicating the result of the write operation with the data cache node 130.

Similarly, during a write operation according to an embodiment of the present invention, gateway node 114 sends a write command to the control processor node 120. In turn, the control processor node 120 identifies a data cache node 130 with a look-up operation and initiates a direct memory access read request to the data cache node 130. The data cache node 130 responds to the control processor node 120 with a remote-direct-memory-access read response including the requested data. Upon receiving the requested data, the control processor node 120 passes a status response message to gateway node 114 indicating the result of the read operation with the data cache node 130.

The 3PRDMA-MAP, in accordance with an embodiment of the present invention, is constructed within the target node at initialization and updated over time as new initiator/target/memory node relationships are formed. Each target may maintain and manage its own 3PRDMA-MAP. Accordingly, 3PRDMA-MAPs in individual targets are not related to one another. Furthermore, to avoid ambiguity of the mapping for in-process operations, a target may also provide a mechanism for automatically updating the 3PRDMA-MAP or reach quiescence before a 3PRDMA-MAP is updated.

To form a new initiator/target/third party relationship in one embodiment, the initiator performs a protocol log-in procedure as provided by a standard protocol to a target. A log-in procedure, such as that provided in the standard SCSI over RDMA Protocol, automatically establishes a direct memory access channel between the initiator and the target. A log-in procedure, such as that provided by iSER, automatically negotiates a direct memory access channel between the initiator and the target. After a successful log-in, the initiator may start operating in a standard protocol mode with the target.

To take advantage of 3PRDMA, the initiator further instructs the target to establish direct memory access channels with third parties, such as data cache memory nodes 130. For each such direct memory access channel the initiator also supplies the target with a 3PRDMA-R-key to be used in the 3PRDMA-MAP. The corresponding Original Path-ID is readily available as the target is aware of the path through which the initiator is logged in. The Derived-Path-ID, and Derived R-key to be paired with the given original Path-ID and R-key are also available to the target as they are a result of the standard remote-direct-memory-access-channel establishment/accessible memory registration process. According to a further embodiment, the initiator may convey the above instructions and 3PRDMA R-keys to the target through out-of-band communications or by way of writing to vendor specific control mode pages in the target, or as part of the login negotiation.

In choosing 3PRDMA-R-keys to enter into the 3PRDMA-MAP, the initiator must be careful to select keys that do not conflict with any existing R-keys already in use. Such existing R-keys are readily identifiable since they are the result of the standard direct memory access channel establishment/accessible-memory registration process. Similarly, the initiator must also ensure that conflicts are not created during later updates to the 3PRDMA-MAP.

If more R-keys are subsequently created within the given direct memory access channel, it may accomplish this, for example, by choosing new R-keys that do not conflict with existing 3PRDMA-R-keys or by changing the conflicting 3PRDMA-R-key to a new value and updating the 3PRDMA-MAP accordingly. Because the look-up is performed using an original Path-ID, R-key tuple, the initiator does not need to worry about conflicts with R-keys that are used in any other remote-direct-memory-access channels.

Figure 2:
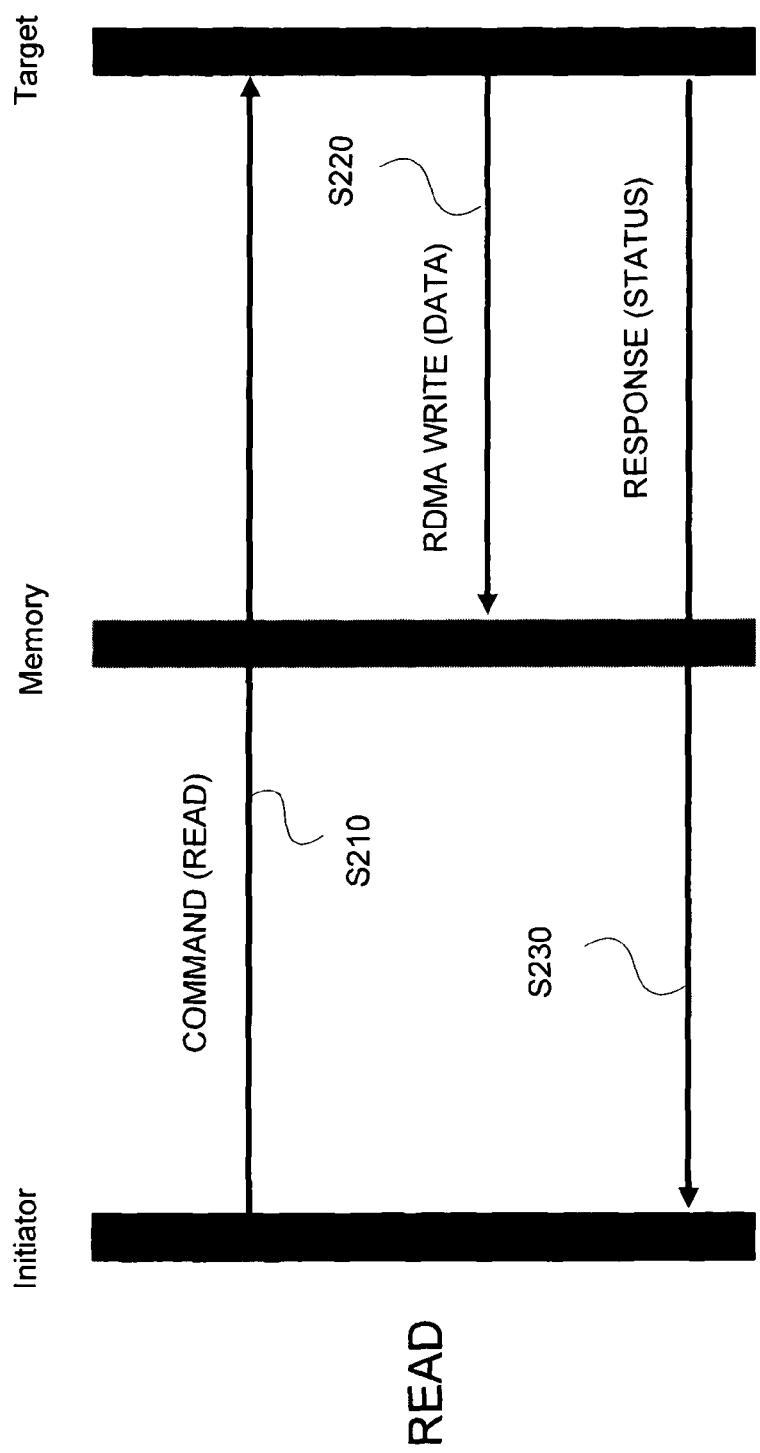
FIG. 2 is a flow diagram showing a method for reading data according to an embodiment of the present invention.
Figure 3:
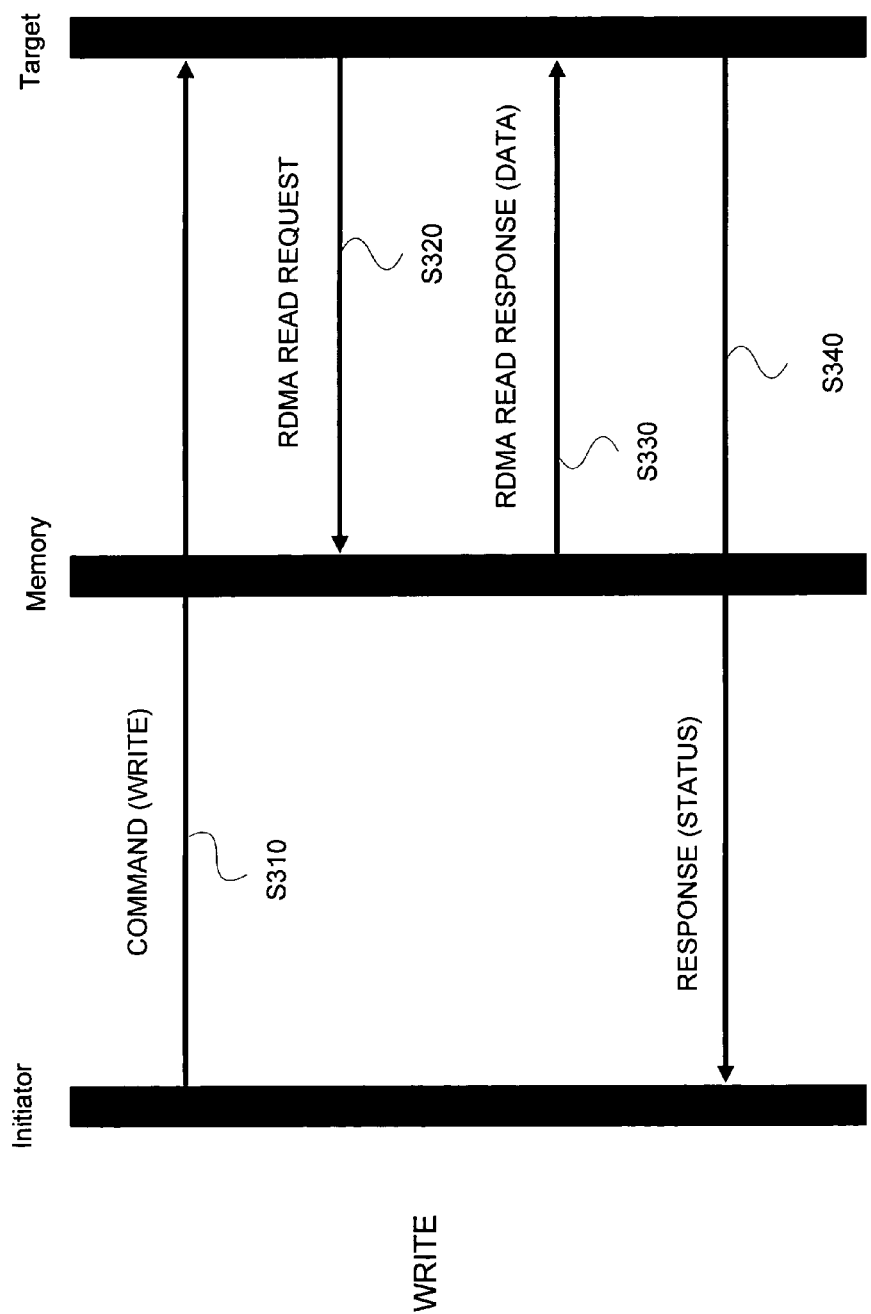
FIG. 3 is a flow diagram showing a method for writing data according to an embodiment of the present invention.

As shown in FIGS. 2 and 3, the present invention provides a method for reading and writing data where control signals and data signals are passed through different communication paths to different nodes within a network.

Turning to FIG. 2, a flow diagram is provided showing a method for reading data from a target according to an embodiment of the present invention. The process as shown is followed when a target node matches the Path-ID and R-key values to an entry within a 3PRDMA-Map and resulting in a Derived-Path-ID and Derived-R-key values. The process begins in step S210 with an initiator, such as a gateway node or control processor node, sending a read command to a target, such as a control processor node. In step S220, the target submits a remote-direct-memory-access-write command to a third party containing memory set aside for remote direct memory access operations. In step S230, the target also issues a status response to the initiator providing the result of the write operation to the third-party node, step S220.

Turning to FIG. 3, a flow diagram is provided showing a method for writing to a target according to an embodiment of the present invention. The process as shown is followed when a target node matches the Path-ID and R-key values to an entry within a 3PRDMA-Map and resulting in a Derived-Path-ID and Derived-R-key values. In FIG. 3, the method begins in step S310 with an initiator, such as a gateway node or control processor node, sending a write command to a target, such as a control processor node. In step S320, the target submits a remote-direct-memory-access read command to a third party containing memory set aside for remote direct memory access operations. In step S330, the third party sends a direct-memory-read-response with the requested data to the target. In step S340, the target also issues a status response to the initiator providing the result of the remote-direct-memory-access read response operation of step S330.

Figure 4:
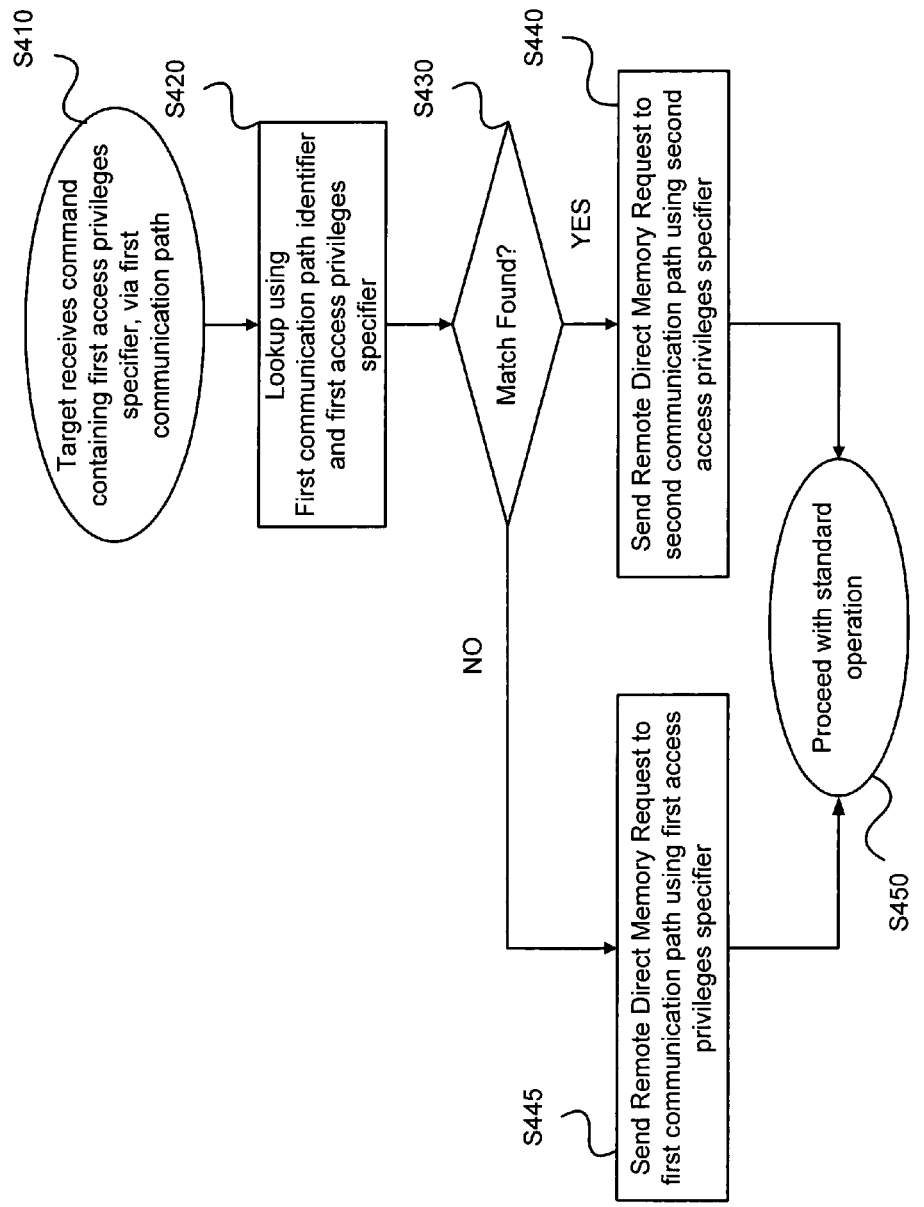
FIG. 4 is a flow diagram illustrating a communication path selection process according to an embodiment of the present invention.

FIG. 4 shows a flow diagram illustrating the communication path selection according to an embodiment of the present invention. The method begins in step S410 with a target receiving a command containing a first access privileges specifier, such as an R-key, via a first communication path. The target is also aware of a first communication path identifier, such as a QP-ID or DMA-SID. In step S420, the first access privileges specifier and the first communication path identifier are compared with a list of entries containing access privilege and communication path identifier pairings, such as a 3PRDMA-MAP.

In step S430, the result of the comparison is obtained. If a match is found within the pairings, then the process moves to step S440 where a second access privileges specifier replaces the first access privileges specifier and a second communications path identifier replaces the first communications path identifier, and remote-direct-memory-access operations are done with the second access privileges specifier and the second communications path identifier. For example, in one embodiment a Derived QPID and Derived R-key replace the original QPID and R-key. Thus, the remote-direct-memory-access request is sent over the channel identified by the Derived QPID using the Derived R-key access privileges. The process then moves to step S450. Alternatively, if a match is not found in step S430, the process moves to step S445 where the first access privileges specifier and the first communication path identifier are used for subsequent remote-direct-access-memory operations. The process then moves to step S450. In step S450, communications continue using the access privileges specifier and the communication path identifier resulting from steps S440 or S445.

According to a further embodiment, backwards compatibility with a standard protocol is provided. For example, when a match is not found in the 3PRDMA-MAP, the original Path-ID and R-key, formatted according to a standard protocol, will be used. Thus, a standard protocol initiator will continue to work with a third party direct memory access target and a third party direct memory access initiator will continue to work with a standard protocol target operating in standard protocol mode.

It will be apparent to those skilled in the art that various modifications and variations can be made in the present invention without departing from the spirit or scope of the invention. Thus, it is intended that the present invention covers the modifications and variations of this invention provided that they come within the scope of any claims and their equivalents.

What is claimed is:

1. A network system for separating control path and data path comprising:
   a first node, communicatively linked to an interconnection fabric, for initiating an operation command;
   a second node, logically connected to the first node and communicatively linked to the interconnection fabric, for receiving the operation command and conducting a third-party remote direct memory access operation by generating a remote direct memory access request based on the operation command, and sending the remote direct memory access request;
   a third node, logically connected to the second node and communicatively linked to the interconnection fabric, for receiving the remote direct memory access request;
   a first communication path in the interconnection fabric for communicating the operation command between the first node and the second node; and
   a second communication path in the interconnection fabric for communicating the remote direct memory access request between the second node and third node;
   wherein the second node responds to the first node with a status report upon the completion of the third-party remote direct memory access operation.

2. The system of claim 1, wherein the operation command further comprises a first access privileges specifier identifying the access privileges between the first node and the second node.

3. The system of claim 1, wherein the operation command further comprises:
   an access privileges specifier identifying the access privileges between the first node and the second node; and
   a communication path identifier identifying the first communication path.

4. The system of claim 1, wherein the remote direct memory access request further comprises:
   an access privileges specifier identifying the access privileges between the second node and the third node; and
   a communication path identifier identifying the second communication path.

5. The system of claim 1, further comprising a third-party remote direct memory access map, logically connected to the second node, containing a list of one or more access privilege specifier and communication path identifier pairs, wherein each access privilege specifier and communication identifier pair is associated with a second access privilege specifier and a second communication path identifier pair.

6. The system of claim 5, wherein the operation command further comprises a first access privileges specifier and communications path identifier pair, and the third-party remote direct memory access request further comprises a second access privileges specifier and communications path identifier pair selected from the third-party remote direct memory access map.

7. A network system for separating control and data paths within a server system, comprising:
   an interconnection fabric for communicatively linking one or more devices in a server system;
   a first server of the server system initiating a read or write command;
   a second server of the server system linked to the first server via the interconnection fabric, wherein the second server receives the read or write command over a first communication path of the interconnection fabric and sends a remote direct memory access request generated based on the read or write command over the interconnection fabric; and
   a third server of the server system linked to the second server via the interconnection fabric, wherein the third server receives the remote direct memory access request over a second communication path of the interconnection fabric, whereby the read or write command and the remote direct memory access request are transferred in the interconnection fabric over separate paths.

8. A network system for separating control path and data path comprising:
   a first node, communicatively linked to an interconnection fabric, for initiating an operation command;
   a second node, logically connected to the first node and communicatively linked to the interconnection fabric, for receiving the operation command and conducting a third-party remote direct memory access operation by generating a remote direct memory access request based on the operation command, and sending the remote direct memory access request;
   a third node, logically connected to the second node and communicatively linked to the interconnection fabric, for receiving the remote direct memory access request;
   a first communication path in the interconnection fabric for communicating the operation command between the first node and the second node; and
   a second communication path in the interconnection fabric for communicating the remote direct memory access request between the second node and third node;

wherein the operation command further comprises a communication path identifier identifying the first communication path and wherein the remote direct memory access request further comprises a communication path identifier identifying the second communication path.

9. The network system of claim 8, wherein the second node responds to the first node with a status report upon the completion of the third-party remote direct memory access operation.

10. The network system of claim 8, wherein the operation command further comprises an access privileges specifier identifying the access privileges between the first node and the second node; and wherein the remote direct memory access request further comprises an access privileges specifier identifying the access privileges between the second node and the third node.

11. The network system of claim 8, further comprising a third-party remote direct memory access map, logically connected to the second node, containing a list of one or more access privilege specifier and communication path identifier pairs, wherein each access privilege specifier and communication identifier pair is associated with a second access privilege specifier and a second communication path identifier pair and further wherein the operation command further comprises a first access privileges specifier and communications path identifier pair and the third-party remote direct memory access request further comprises a second access privileges specifier and communications path identifier pair selected from the third-party remote direct memory access map.

12. The network system of claim 8, wherein the second node determines the second communication path based on a looking up a communications path identifier in the operations command in a list of path identifier and communication path pairs stored in memory accessible within the network system.

* * * * *